United States Patent
Kwak et al.

(10) Patent No.: US 7,881,523 B2
(45) Date of Patent: Feb. 1, 2011

(54) MOBILE COMMUNICATION TERMINAL AND METHOD FOR DISPLAYING AN IMAGE

(75) Inventors: Jae Do Kwak, Seoul (KR); Tae Ik Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 963 days.

(21) Appl. No.: 11/735,377

(22) Filed: Apr. 13, 2007

(65) Prior Publication Data
US 2007/0280546 A1 Dec. 6, 2007

(30) Foreign Application Priority Data
May 11, 2006 (KR) ...................... 10-2006-0042488

(51) Int. Cl.
*G06K 9/00* (2006.01)
(52) U.S. Cl. ..................................... 382/154
(58) Field of Classification Search .................. 382/154
See application file for complete search history.

(56) References Cited
U.S. PATENT DOCUMENTS 4,794,634 A   12/1988  Torihata et al.
7,371,163 B1 *  5/2008  Best .............................. 463/1
2004/0070673 A1 *  4/2004  Nakamura ............... 348/207.2
2006/0126177 A1 *  6/2006  Kim et al. .................... 359/465
2008/0013001 A1 *  1/2008  Jang et al. ..................... 349/15

FOREIGN PATENT DOCUMENTS

EP   0 953 962 A2   11/1999
EP   1 331 546 A2    7/2003
EP   1 406 456 A2    4/2004
GB   2 334 680 A     9/1999

* cited by examiner

*Primary Examiner*—Tom Y Lu
(74) *Attorney, Agent, or Firm*—Birch, Stewart, Kolasch & Birch, LLP

(57) ABSTRACT

A mobile communication terminal including a memory unit configured to store images and control information indicating whether the images are to be displayed as two-dimensional images or three-dimensional images, a display unit configured to display the images, a barrier panel configured to generate a difference between a focus of first image incident on a user's right eye and a focus of a second image incident on the user's left eye, and a control unit configured to selectively activated or deactivated the barrier panel in accordance with the control information.

8 Claims, 11 Drawing Sheets

FIG. 1

| a first field (header-field) | a second field (additional information field) | a third field (data field) |

FIG. 3A

| Parameter Id $b_5$ $b_0$ | Parameter | Definition | Possible occurrences | Usage mandatory for content provider | Support mandatory for MOT decoders |
|---|---|---|---|---|---|
| 00 0000 | reserved for MOT protocol extensions | | | | |
| 00 0001 | PermitOutdatedVersions | 6.2.3.1.2 | only once | no | no |
| 00 0010 00 0011 00 0100 | reserved for MOT protocol extensions | | | | |
| 00 0101 | TriggerTime (user application specific parameter) | see [5] | see [5] | see [5] | see [5] |
| 00 0110 | reserved for MOT protocol extensions | | | | |
| 00 0111 | RetransmissionDistance | 6.2.3.1.5 | only once | no | no |
| 00 1000 | reserved for MOT protocol extensions | | | | |
| 00 1001 | Expiration | 6.2.3.1.1 | only once | no | yes, if receiver provides "MOT caching support" |
| 00 1010 | Priority | 6.2.3.1.4 | only once | no | no |
| 00 1011 | Label (user application specific parameter) | see [6] | only once | no | no |
| 00 1100 | ContentName | 6.2.2.1.1 | only once | yes | yes |
| 00 1101 | UniqueBodyVersion | 6.2.3.1.3 | only once | no | no |
| 00 1110 00 1111 | reserved for MOT protocol extensions | | | | |
| 01 0000 | MimeType | 6.2.2.1.2 | only once | user application specific | user application specific |
| 01 0001 | CompressionType | 6.2.2.1.3 | only once | yes (if body is compressed) | yes; every receiver must check if an object is compressed |
| 01 0010 ... 01 1111 | reserved for MOT protocol extensions | | | | |
| 10 0000 | AdditionalHeader (user application specific parameter) | see [6] | once or several times | see [6] | see [6] |
| 10 0001 | ProfileSubset | 6.2.3.3.1 | only once | no | no |
| 10 0010 | reserved for MOT protocol extensions | | | | |
| 10 0011 | CAInfo | 6.2.3.2.1 | only once | yes (if CA is used) | yes; every receiver must check if an object is scrambled |
| 10 0100 | CAReplacementObject | 6.2.3.2.2 | only once | no | no |
| 10 0101 ... 11 1111 | reserved for user application specific parameters | | | | |

FIG. 3B

| $b_7b_4$ | Description |
|---|---|
| 0 0 0 0 | complete EBU Latin based repertoire [25] |
| 0 0 0 1 | EBU Latin based common core, Cyrillic, Greek [25] |
| 0 0 1 0 | EBU Latin based core,Arabic,Hebrew,Cyrillic,Greek [25] |
| 0 0 1 1 | ISO Latin Alphabet No 2 (see ISO-8859 Part 2 [7]) |
| 0 1 0 0 | ISO Latin Alphabet No 1 (see ISO-8859 Part 1 [6]) |

MOBILE COMMUNICATION TERMINAL AND METHOD FOR DISPLAYING AN IMAGE

The present application claims priority to Korean Application No. 10-2006-0042488, filed on May 11, 2006, which is hereby incorporated by reference in its entirety.

BACKGROUND OF THE INVENTION

1. Field of the Invention

The present invention relates to a mobile communication terminal and a method for displaying an image using the mobile communication terminal.

2. Discussion of the Related Art

A mobile communication terminal not only functions as a phone, but also transmits and receives multimedia files, emails, text files, etc. The mobile terminal also provides an instant message service and receives and outputs broadcasting objects. However, the amount of data transmitted by the terminal is limited by the bandwidth of a communication system.

Further, in a broadcasting system or a communication system, a sending terminal transmits two-dimensional images sequentially in a predetermined interval, and a receiving terminal receives and displays the transmitted images according to the same interval. In addition, because the bandwidth of the sending terminal is limited by the bandwidth of the corresponding communication system, the sending terminal is generally not able to transmit and display three-dimensional images. That is, a size of the three-dimensional images is larger than two-dimensional images, and thus it is more difficult to transmit and display three-dimensional images.

SUMMARY OF THE INVENTION

Accordingly, one object of the present invention is to address the above-noted and other problems.

Another object of the present invention is to provide a mobile communication terminal and corresponding method for realistically displaying an image.

Yet another object of the present invention is to provide a mobile communication terminal and corresponding method for displaying a three-dimensional image.

To achieve these objects and other advantages in accordance with the purpose of the invention, the present invention provides in one aspect a mobile communication terminal including a memory unit configured to store images and control information indicating whether the images are to be displayed as two-dimensional images or three-dimensional images, a display unit configured to display the images, a barrier panel configured to generate a difference between a focus of first image incident on a user's right eye and a focus of a second image incident on the user's left eye, and a control unit configured to selectively activated or deactivated the barrier panel in accordance with the control information.

In another aspect, the present invention provides a method of displaying images on a mobile communication terminal. The method includes storing in a memory unit images and control information indicating whether the images are to be displayed as two-dimensional images or three-dimensional images, displaying on a display unit the images, generating via a barrier panel a difference between a focus of first image incident on a user's right eye and a focus of a second image incident on the user's left eye, and selectively controlling the barrier panel to activate or deactivate in accordance with the control information via a control unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 1 is an overview illustrating a data structure including control information according to an embodiment of the present invention;

FIGS. 3A and 3B are overviews illustrating a portion of the Multimedia Object Transfer (MOT) protocol used in a broadcasting system;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First, to describe embodiments of the present invention, a principle and a data structure for displaying a three-dimensional image will now be described. In more detail, the mobile communication terminal receives two or more two-dimensional images, composes the received images, and displays the composed image as a three-dimensional image. Further, the mobile terminal receives a signal including control information representing that the received images can be displayed as at least one three-dimensional image.

More specifically, the control information includes a display dimension and display order of the two-dimensional images. The terminal then uses the control information to display the received two-dimensional images as a three-dimensional image. That is, the three-dimensional image is an image which is generated by composing two 2-dimensional images. The composed image then looks like a three-dimensional image based on the phenomenon called the human's binocular disparity.

That is, one image is generated to be reflected by the human's left eye (hereinafter referred to as a left eye image, and represented as subscript L), and another image is generated to be reflected by the human's right eye (hereinafter referred to as a right eye image, and represented as subscript R). The images can then be displayed such that the images appear as a three-dimensional image. Further, in the below description, an image group means a group in which two on more related images are gathered, such that the images in the group can be displayed as sliding images or moving images.

Turning next to FIG. 1, which is an overview illustrating an example of a data structure including control information according to an embodiment of the present invention. As shown, the data structure includes a first field which includes information related to a data structure of an image object, a second field which includes the control information, and a third field which includes the raw data of the image object.

In addition, the first field is generally called the header field, and the third field is generally called the data field or body field of the image object data. However, other names can be given to these fields. Further, the second field is referred to as an additional information field. According to one example of the present invention, the additional information field includes the control information related to the displaying order of the objects. However, the control information may also be included in any field.

Figure 2:
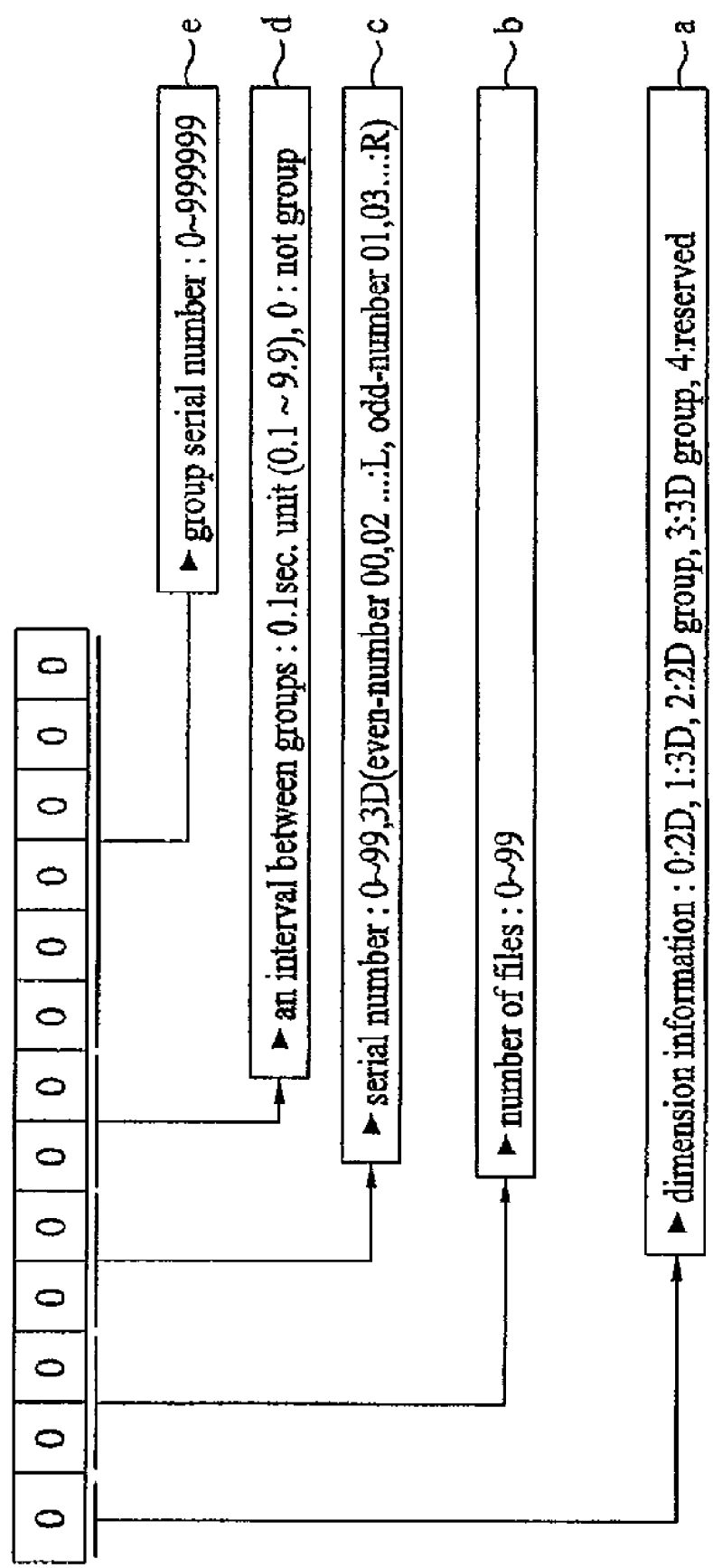
FIG. 2 is an overview illustrating in detail an additional information field according to an embodiment of the present invention.

Next, FIG. 2 is an overview illustrating in detail the additional information field. As discussed above, the display control information includes at least one of dimension information and display order information about the images in the data. As shown in FIG. 2, the additional information field includes an image display field (a) including at least one of dimension information and display order information.

In the example shown in FIG. 2, the value of 0 (zero) indicates a two-dimensional image (i.e., the images are displayed as they stand) and the value of 1 (one) indicates the data can be displayed as a three-dimensional image. Further, because the display filed (a) can be set to the value of 0 (zero) corresponding to a two-dimensional image, the system of the present invention is backward compatible with the general display method.

Also, the value of the image display field being 2 (two) represents that the images in the data are in a two-dimensional image group, and the value of the image display field being 3 (three) represents that the images are in a three-dimensional image group. In addition, the images in a two-dimensional image group can be displayed as sequential sliding two-dimensional images, and the images in a three-dimensional image group can be displayed as three-dimensional moving images.

As shown in FIG. 2, the control information also includes a field (b) indicating the number of images in an image group (a); a field (c) indicating serial numbers of images in an image group; a field (d) indicating a displaying interval of images; and a field (e) indicating the serial number of the image groups if the images are two or more image groups.

Further, the information representing a number of images in an image group means the total number of images included in an image group. That is, in the example of FIG. 2, the information representing a number of images in an image group is valid when the image display field is 2 or 3. Also, the information indicating serial numbers of images in an image group is from 0 to 99 in the example of FIG. 2. In addition, if a displayed image is a three-dimensional image, the information indicating serial numbers of images in an image group can be an even-number for the left eye images, and an odd-number as for the right eye images.

Further, the information indicating a displaying interval of images displayed by respective image groups means an interval between an image displayed by an image group and another image displayed by another image group. The example in FIG. 2 represents that information indicating a displaying interval of images displayed by respective image groups is 0.1 second, and if this information is 0 (zero), it means that the image is not included in a group.

Also, the information indicating serial numbers of image groups means numbers labeled in each group. In the example of FIG. 2, the information indicating serial numbers of image groups has the value ranged from 0 to 999999. Further, the data structure illustrated in FIG. 2 can be transmitted or received on any broadcasting system or communication system.

That is, a broadcasting system or a communication system transmits or receives an object according to a variety of different protocols. Thus, the fields illustrated in FIG. 2 can be set in a reserved field or user private field in a protocol of the broadcasting system or the communication system. In one example of the present invention, the Multimedia Object Transfer (NOT) protocol is used. Therefore, the MOT protocol will be described hereinafter.

Turning next to FIGS. 3A and 3B, which illustrate a part of the MOT protocol used in one example of a broadcasting system. In more detail, FIG. 3A illustrates a part of the data fields of the MOT protocol, which can be used in the multimedia digital audio broadcasting (DAB) system in accordance with EN 301 234 version 2.1.1. In this example, the data structure illustrated in FIG. 2 is defined in a reserved field in the MOT protocol ("reserved for MOT protocol extensions" in FIG. 3A). The reserved field is shown in detail in FIG. 3B.

In addition, the control information may be established in a designated region in the MOT protocol, if the designated region is not used. Also, the control information can be established in a variable length of reserved fields according to the MOT protocol. Further, the variable length of data field is more preferable than the fixed length of data field, because the variable length of data field can be extended.

In more detail, and as shown in the example of FIG. 3A, the control information illustrated in FIG. 2 is established in the ContentName field according to the MOT protocol. Further, in FIG. 3A, as the specific indicator for establishing fields like the ContentName field, the Arabic numerals is established, which is shown in FIG. 3B. Thus, as show, if the control information inserted in the ContentName field by the data field and the value of the data field is transmitted, the images are displayed in accordance with the control information.

Thus, a mobile communication terminal according to an embodiment of the present invention receives a variable length of control information, for example, the ContentName field in the MOT protocol. Therefore, the mobile communication terminal according to an embodiment of the present invention displays the images in accordance with the control information.

Figure 4:
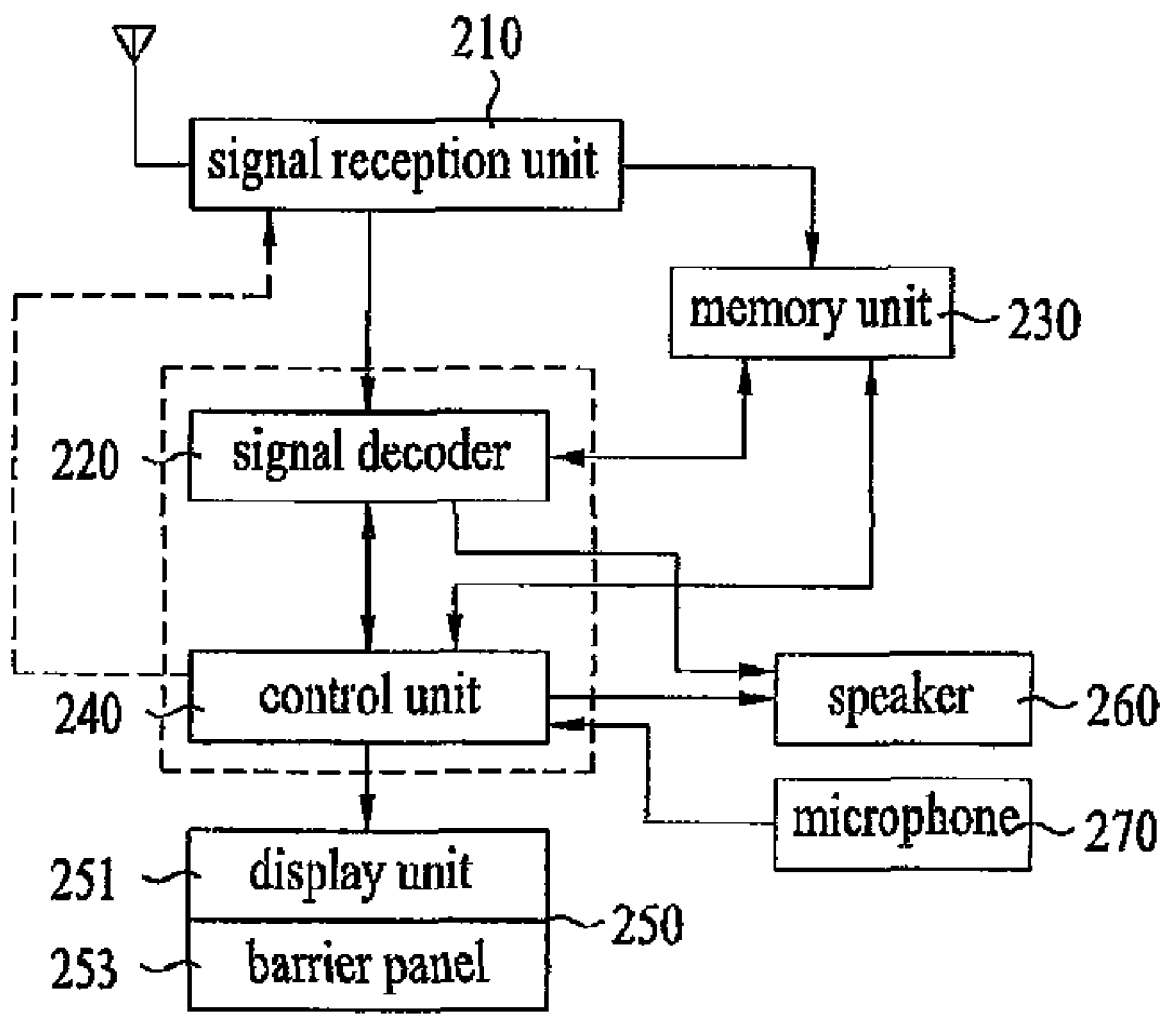
FIG. 4 is a block diagram illustrating a mobile communication terminal according to an embodiment of the present invention.

Next, FIG. 4 illustrates a mobile communication terminal according to an embodiment of the present invention. As shown, the mobile communication terminal includes a signal reception unit 210, a signal decoder 220, a memory unit 230, a control unit 240 and output unit 250. Further, the output unit includes a display unit 251 and a barrier panel 253. FIG. 4 also illustrates a speaker 260 and microphone 270.

In addition, the signal reception unit 210 receives a signal in accordance with a broadcasting protocol or a communication protocol. The signal received by the signal reception unit 110 includes images and the control information for the images. As discussed above, the images are two-dimension images which can be displayed as at least one three-dimension image.

Further, the signal reception unit 210 preferably includes a transceiver such that the reception unit 210 can both transmit and receive signals. In addition, the signal decoder 220 decodes the images and the control information included in the received signal, and the memory unit 230 stores the decoded images and the decoded control information. In addition, the memory unit 230 may include an images buffer for storing the images, and a separate information storage area for storing the display control information. Further, each image frame may include control information or one image frame may include control information for more than one image, Also, the control unit 240 controls the overall operation of the units shown in FIG. 4 and the mobile terminal in general. In addition, in accordance with an embodiment of the present invention, the control unit 240 activates the barrier panel 253 when the control unit 240 determines from the control information that the decoded images are to be displayed as a three-dimensional image. As discussed above, the received image can be displayed as a three-dimensional image using the phenomenon of the human's binocular disparity.

That is, when a difference between a first two-dimensional image (R) seen from a viewer's right eye and a second two-dimensional image (L) seen from a viewer's left eye is generated, the human mind sees the first and second images as a three-dimensional image. Thus, the control unit 240 activates the barrier panel 253 and composes and displays the first and second images on the display unit 251 such that the viewer sees a three-dimensional image.

In addition, the control unit 240 may compose two images using a composing method such as an interpolation method. That is, the interpolation method interpolates the first and second images by the pixel. Therefore, when the control unit 240 composes two images for displaying a three-dimensional image, the control unit 240 activates the barrier panel 253.

In addition, hereinafter, a first image (R) for the right eye of the user and a second image (L) for the left eye of a user will be referred to as a pair image of a three-dimensional image. Further, the control unit 240 is included in a block with the signal decoder 220 in FIG. 4. However, the control unit 240 and the decoder 220 may be designated as separate boxes.

Figure 5:
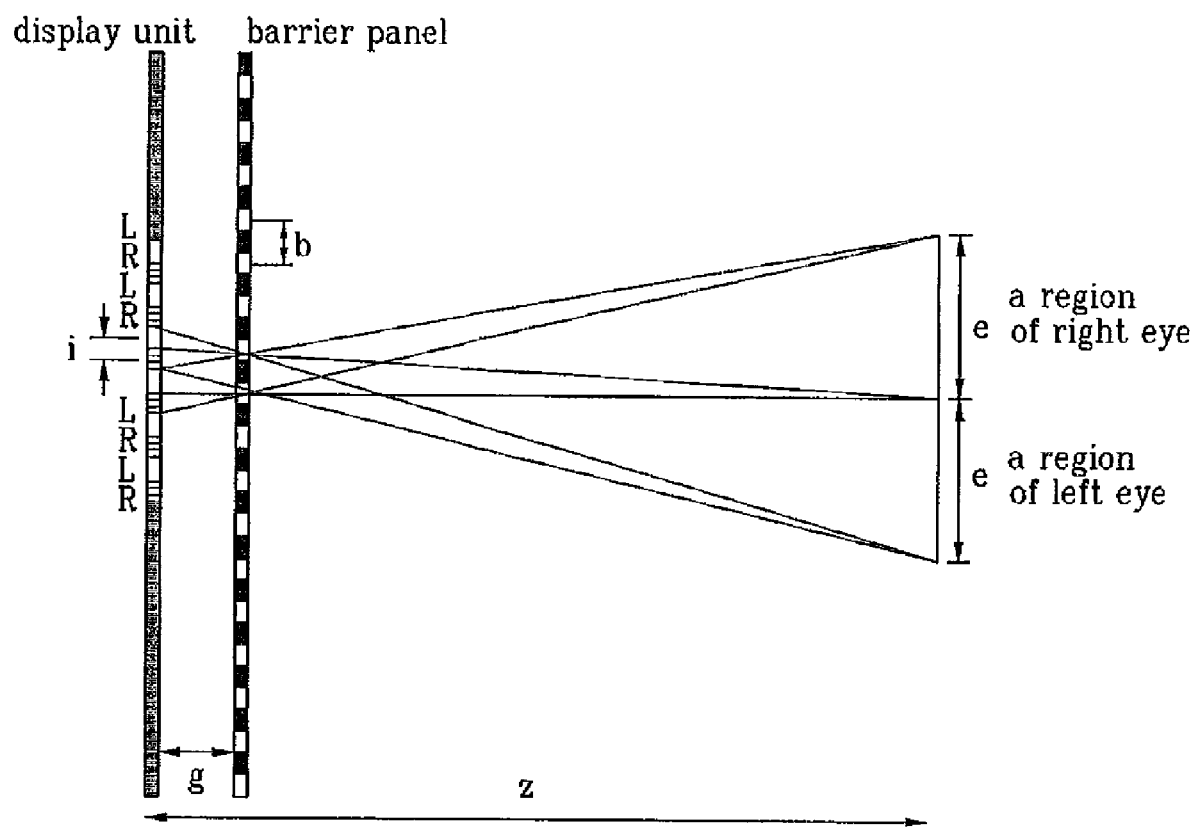
FIG. 5 is a cross-sectional view illustrating a display unit and a barrier panel shown in FIG. 4.

Turning next to FIG. 5, which is a cross-sectional overview illustrating the display unit 251 and the barrier panel 253 shown in FIG. 4. Thus, a principle of displaying a three-dimensional image will now be described with reference to FIG. 5. In more detail, the three-dimensional image can be displayed based on the human's binocular disparity by selectively and appropriately activating the barrier panel 253 according to an embodiment of the present invention.

In addition, the human's binocular disparity means the difference between a focus by a sight ray incident on the right eye and another focus by a sight ray incident on the left eye. That is, when a difference between the first image (R) seen from the right eye of the user and the second image (L) seen from the left eye of the user is generated, the first and second images are composed in the human's brain as a three-dimensional image.

Thus, to display three-dimensional images, the present invention advantageously prepares two images, i.e., an image for the right eye and another image for the left eye, and the two images are composed by the pixel (e.g., through an interpolation method or other composing method). Further, the barrier panel 253 advantageously divides separates sights incident to the display unit 251 so that a three-dimensional images is viewed.

In addition, with reference to FIG. 5, the reference characters "b" denotes the distance between adjacent barriers in a switching panel, "g" denotes the distance between the barrier panel 253 and the display unit 251, and "z" denotes the distance between the focus of the human's eyes and the display unit 251. Further, as shown in FIG. 5, when two images are composed by the pixel, the barrier panel 253 can be activated so that one eyesight from the right eye corresponds to pixels in the right eye image, and the other eyesight from the left eye corresponds to pixels in the left eye image.

Thus, the control unit 240 determines whether a three-dimensional image is to be displayed by reading the control information, and controls the barrier panel 253 to be activated in accordance with the control information. That is, if the barrier panel 253 is activated, the barriers of the barrier panel 253 block sights incident on the display unit 251, and the sights incident on the display unit 251 can be dispersed through the barriers.

Further, the control unit 240 controls the barrier panel 251 using, for example, a driving voltage so that the barrier panel 251 is activated and disperses the sights incident to the display unit 251. In addition, as the transparent degree of the barrier panel 253 becomes higher, the barrier panel 253 becomes less transparent and an amount of transparent light get less, and thus the composed image can look like a three-dimensional image gradually. Otherwise, as the amount of transparent light becomes more, a three-dimensional image gradually becomes the composed images.

Further, the control unit 240 can also deactivate the barrier panel 253 to display a two-dimensional image. That is, the control 240 unit selectively turns off the barrier panel 253 so that the incident sight is not dispersed. Further, in this instance, the control unit 240 does not compose images, and controls the display unit 241 to display the same images that were received.

Figure 6:
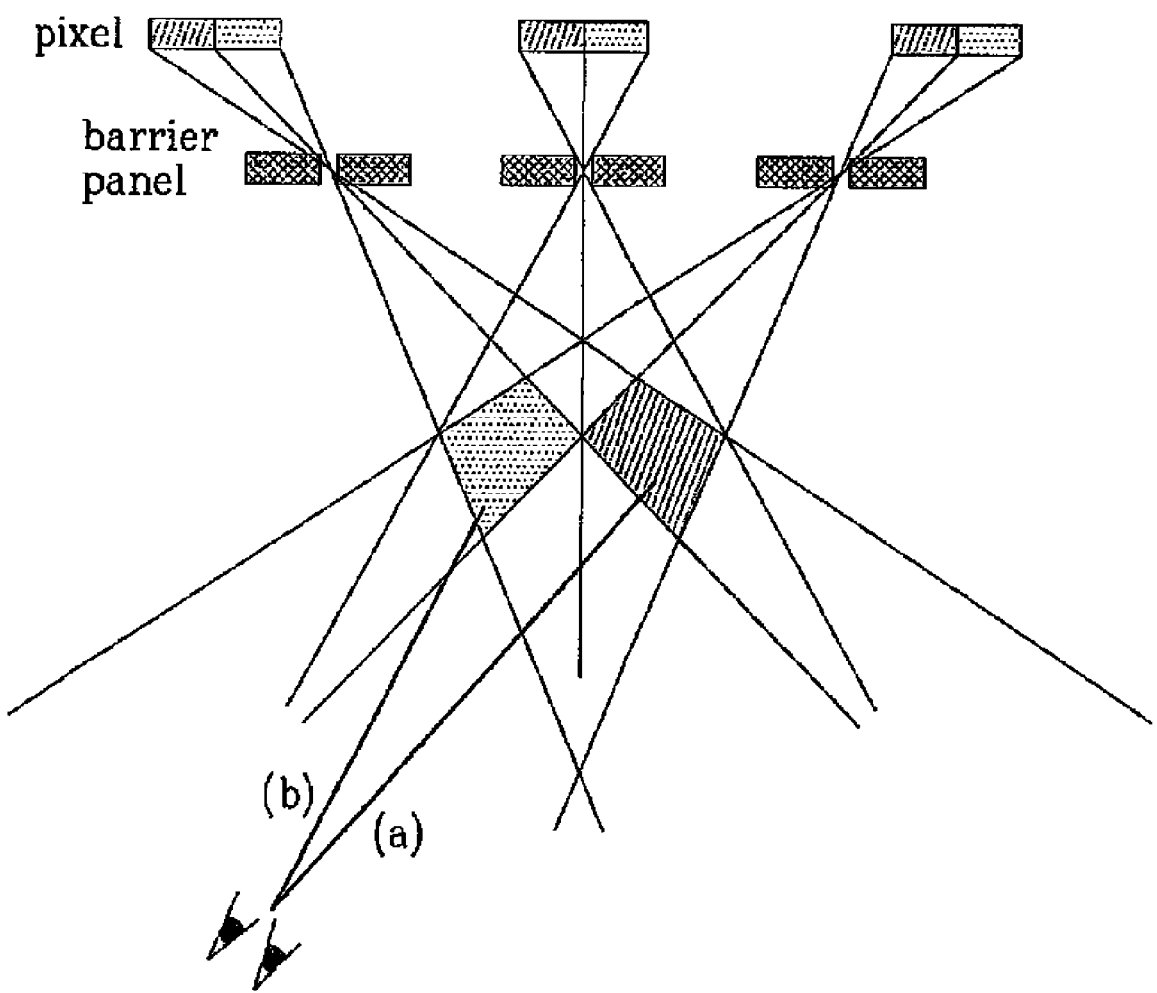
FIG. 6 is another cross-sectional view illustrating a display unit and a barrier panel shown in FIG. 4.

Next, FIG. 6 is another cross-sectional view illustrating the display unit 251 and the barrier panel 253 shown in FIG. 4. In FIG. 6, the shaded region in the display panel represents a pixel at which a sight of the right eye arrives and the dotted region represents a pixel at which a sight of the left eye arrives.

Thus, when the barrier panel 253 is activated, the viewer's eyes receive an image from a pixel in the shaded region and another image from a pixel in the dotted region. In addition, the viewer's mind interprets the two images as a three-dimensional image.

Figure 7:
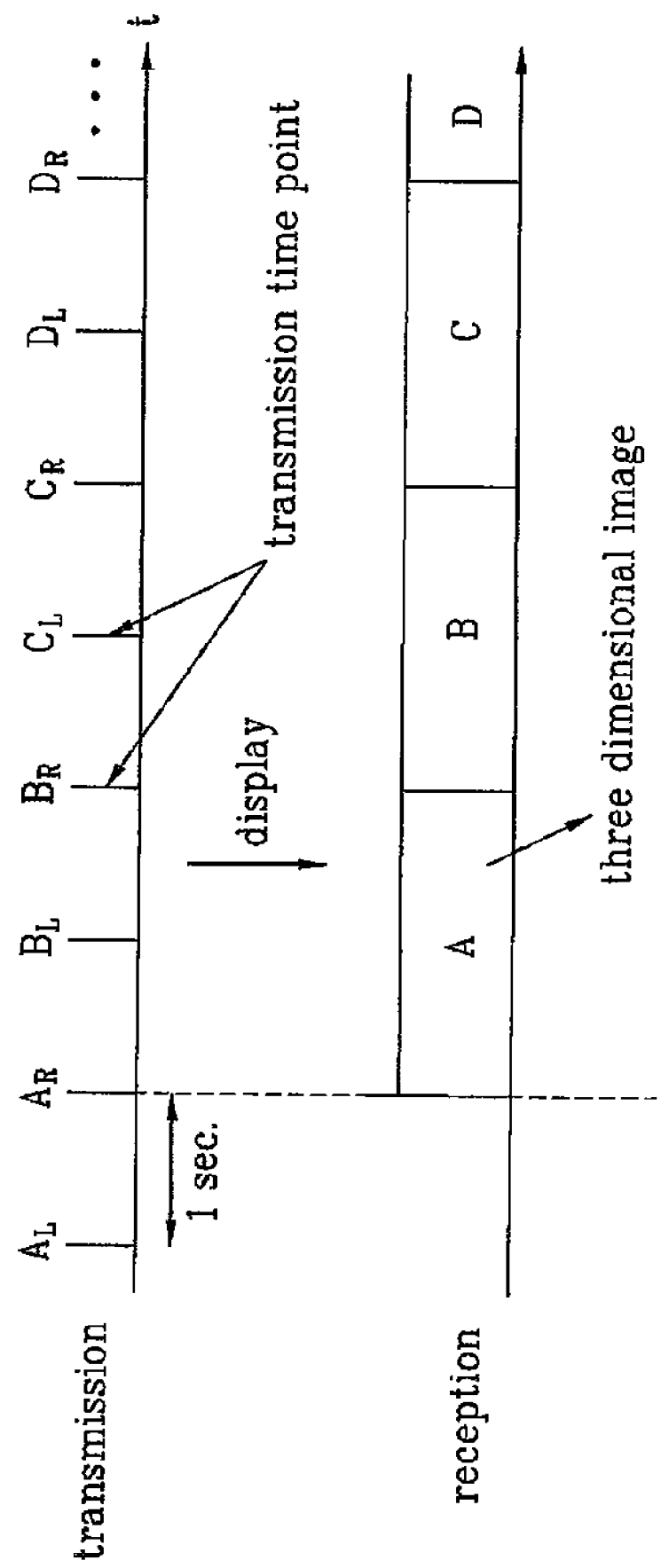
FIG. 7 is a timing diagram illustrating an example of displaying images according to an embodiment of the present invention.
Figure 8:
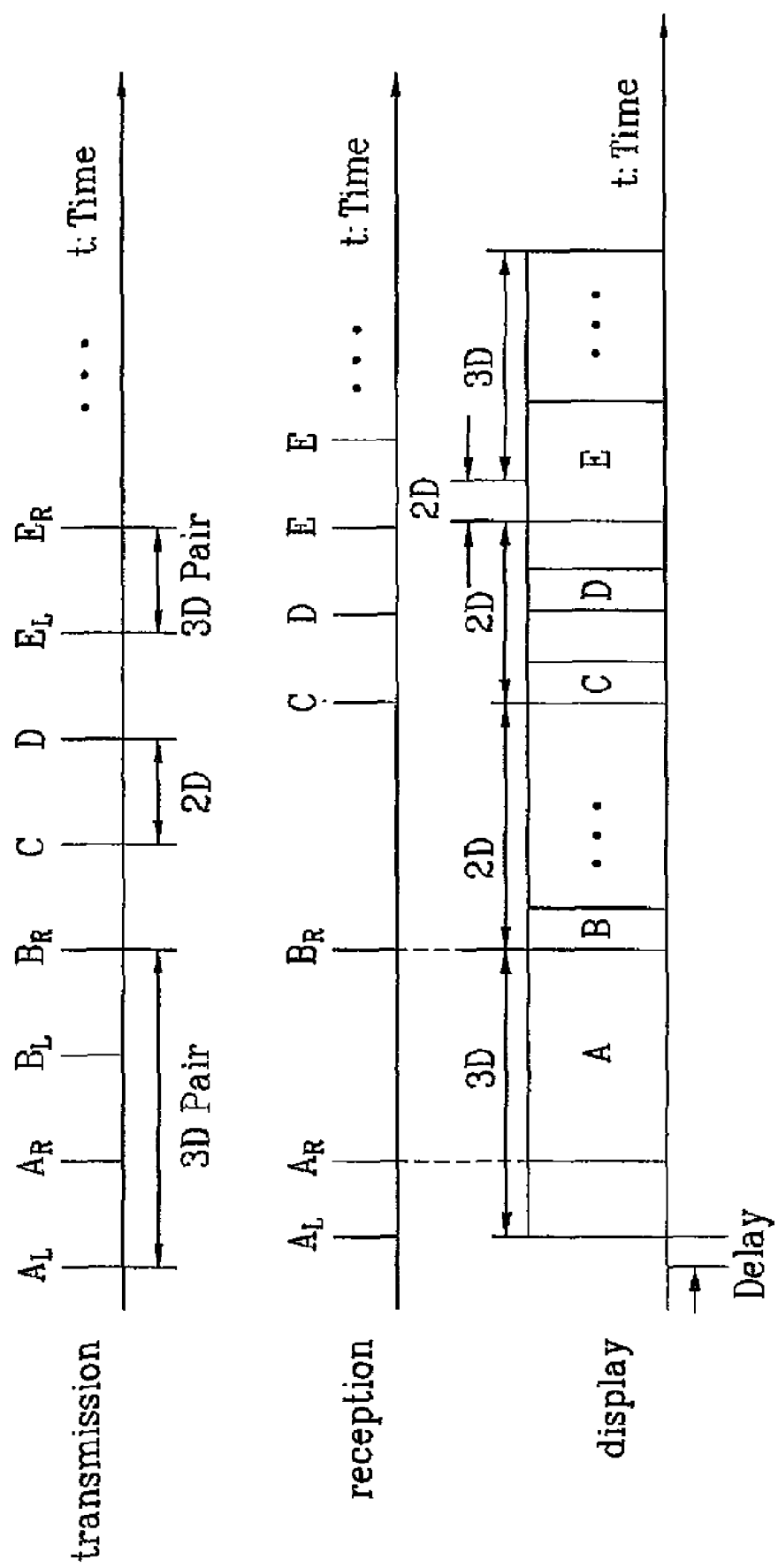
FIG. 8 is a timing diagram illustrating another example of displaying images according to an embodiment of the present invention.

Turning next to FIGS. 7 and 8, which are timelines illustrating different examples of displaying images according to an embodiment of the present invention. As shown in the top part of FIG. 7, left images (index L) and right images (index R) for the three-dimensional images are prepared and transmitted in turn.

In more detail, FIG. 7 represents an image A including image $A_R$ and image $A_L$, an image B including image $B_R$ and image $B_L$, an image C including image $C_R$ and image $C_L$, and an image D including image $D_R$ and image $D_L$. The prepared images are then transmitted in succession. Further, FIG. 7 illustrates the left eye images being transmitted before the right eye images. However, the order may be reversed.

In addition, as shown in the bottom portion of FIG. 7, the mobile terminal displays a three-dimensional image A when both of the $A_R$ and $A_L$ images are received, the three-dimensional B image when both of the $B_R$ and $B_L$ images are received, etc. Thus, a user of the mobile communication terminal sees a three-dimensional image which gives the user a better feel of reality when watching the image.

Next, FIG. 8 illustrates transmitting two-dimensional images as well as three-dimensional images. Further, the image $B_L$ is assumed to be lost in transmission. The images are also displayed randomly. Similar to FIG. 7, the image A includes a right image ($A_R$) and a left image ($A_L$), the image B includes the $B_R$ and $B_L$ images, and the image E includes the $E_L$ and $E_R$ images. However, the images C and D are not to be displayed as three-dimensional images and rather are two-dimensional images. It is assumed the images are transmitted in succession.

As shown in the bottom portion of FIG. 8, after the image $A_L$ is received, the image A is not displayed until the image $A_R$ is received (because the image A is to be displayed as a three-dimensional image). However, the received image $A_L$, can be displayed earlier, and just after the image $A_R$ is received, the three-dimensional image using both of the $A_L$ and $A_R$ images can be displayed.

In addition, since $B_L$ is not received, the two-dimensional image $B_R$ can only be displayed. Further, the two-dimensional images C and D are displayed sequentially as is. Also, the images C and D may be displayed in the same order as they are received. However, the images C and D can be displayed repeatedly as a slide show, immediately after receiving the image D.

Further, as shown in the bottom portion of FIG. 8, the two-dimensional image E is displayed after the image $E_R$ is received. In addition, when the $E_L$ image is received, the three-dimensional image E is displayed. Thus, three-dimensional images can be adaptively displayed using the control information.

Figure 9:
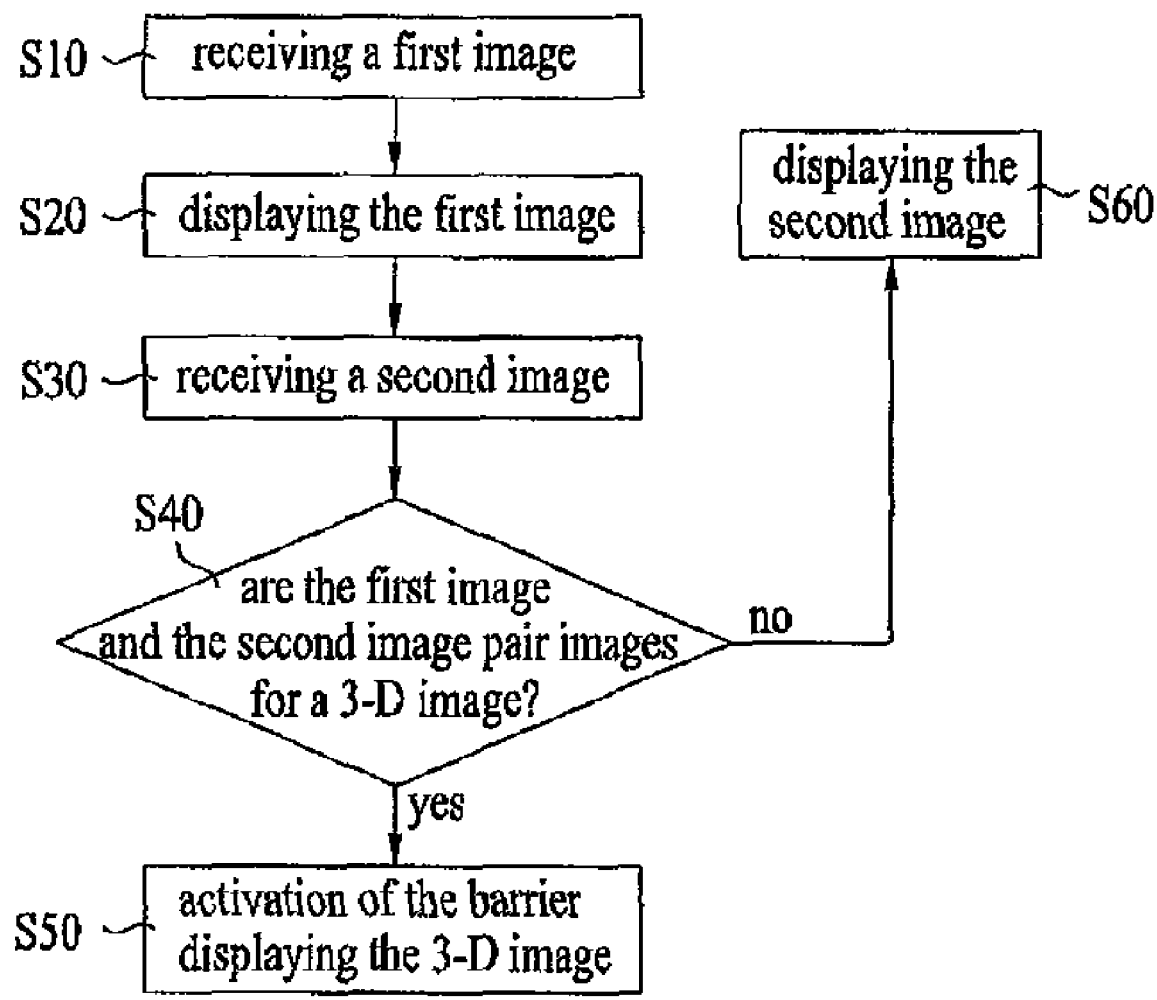
FIG. 9 is a flowchart illustrating a method of displaying images according to an embodiment of the present invention.
Figure 10:
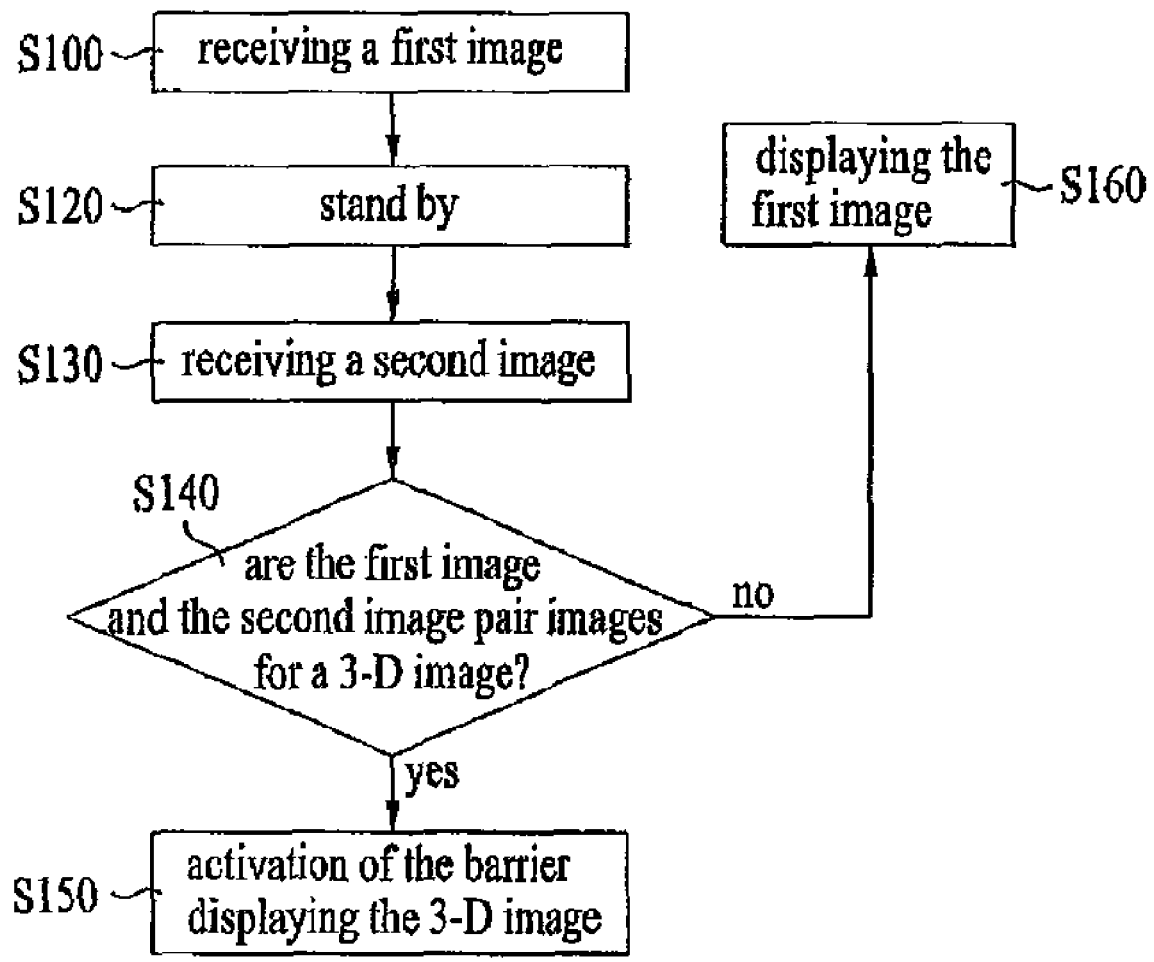
FIG. 10 is another flowchart illustrating a method of displaying images according to another embodiment of the present invention.

Turning next to FIGS. 9 and 10, which are flow charts illustrating a method of displaying images according to an embodiment of the present invention. Further, in this embodiment, it is assumed the first and second images are a pair of images functioning as a three-dimensional image.

In addition, whether a received image is a right eye or left eye image of a three-dimensional image is determined based on the control information of the images. In FIGS. 9 and 10, the right eye image is assumed to be received earlier than the left eye image.

In more detail, FIG. 9 is a flow chart illustrating a method of displaying images according to one embodiment of the present invention. As shown, the first image is received (S10), and the received first image is displayed as a two-dimensional image on a screen (S20). Then, a second image other than the first image is received (S30).

In addition, as discussed above, whether the first and second images correspond to a pair of images for a three-dimensional image is determined based on the control information (S40). If the first and second images are a pair of images for a three-dimensional image (Yes in S40), the three-dimensional image is displayed by activating the barrier panel (S50). On the other hand, if the first and second images are not a pair of images for a three-dimensional image based on the control information (NO in S40), the second image is displayed as a two-dimensional image (S60).

Next, FIG. 10 is a flow chart illustrating a method of displaying images according to another embodiment of the present invention. As shown, the first image is received (S110), and the received image is not displayed until the second image is received and therefore no image is displayed (S120). When a second image other than the first image is received (S130), the control unit determines whether the first and second images are a pair of images by reading the control information (S140).

If the first and second images are a pair of images for a three-dimensional image (Yes in S140), the three-dimensional image is displayed by activating the barrier panel (S150). If the first and second images are not a pair of images for a three-dimensional image (No in S140), the first image is displayed just after the second image is received (S160).

Therefore, according to the present invention, a three-dimensional image can be adaptively displayed by activating the barrier panel. Further, a realistic and actual image can be displayed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal, comprising:
   a wireless communication unit configured to wirelessly receive images and control information from at least one other terminal, said control information indicating whether the images are to be displayed as two-dimensional images or three-dimensional images;
   a display unit configured to display the images;
   a barrier panel configured to generate a difference between a focus of first image incident on a user's right eye and a focus of a second image incident on the user's left eye; and
   a control unit configured to selectively activate or deactivate the barrier panel in accordance with the control information,
   wherein the wireless communication unit is configured to receive the first image at a first reception time and to receive the second image at a second reception time that is after the first reception time,
   wherein the control unit is further configured to deactivate the barrier panel and control the display unit to display the first image when the first image is received at the first reception time from the at least one other terminal, and when the second image is received at the second reception time, to determine whether the first and second images are to be displayed as a three-dimensional image based on the control information, to maintain the barrier panel in the deactivated state and display the second image when the control information indicates the first and second images are not to be displayed as the three-dimensional image, and to activate the barrier panel, compose the first and second images as the three-dimensional image and control the display unit to display the composed image to be displayed as the three-dimensional image when the control information indicates the first and second images are to be displayed as the three-dimensional image, and
   wherein when the control information indicates the first and second images are to be displayed as the three-dimensional image and the second image is not received at the second reception time from the at least one other terminal, the control unit is further configured to deactivate the barrier panel and to display the first image as the two-dimensional image.

2. The mobile communication terminal of claim 1, wherein the barrier panel separates sights incident to the display unit if the barrier panel is activated.

3. The mobile communication terminal of claim 1, wherein when the control information indicates images are to be displayed as three-dimensional images, the control unit composes a pair of images by pixel.

4. The mobile communication terminal of claim 1, wherein the control unit tunes an amount of light being transparent through the barrier panel by gradually driving a voltage of the barrier panel.

5. A method of displaying images on a mobile communication terminal, the method comprising:
   wirelessly receiving, via a wireless communication unit, images and control information from at least one other terminal, said control information indicating whether the images are to be displayed as two-dimensional images or three-dimensional images;
   displaying on a display unit the images;
   generating via a barrier panel a difference between a focus of first image incident on a user's right eye and a focus of a second image incident on the user's left eye; and
   selectively controlling the barrier panel to activate or deactivate in accordance with the control information via a control unit,
   wherein the wirelessly receiving step receives the first image at a first reception time and receives the second image at a second reception time that is after the first reception time,
   wherein the selectively controlling step deactivates the barrier panel and controls the display unit to display the first image when the first image is received at the first reception time from the at least one other terminal, and when the second image is received at the second reception time, determines whether the first and second images are to be displayed as a three-dimensional image based on the control information, maintains the barrier panel in the deactivated state and displays the second image when the control information indicates the first and second images are not to be displayed as the three-dimensional image, and activates the barrier panel, composes the first and second images as the three-dimensional image and controls the display unit to display the composed image to be displayed as the three-dimensional image when the control information indicates the first and second images are to be displayed as the three-dimensional image, and
   wherein when the control information indicates the first and second images are to be displayed as the three-dimensional image and the second image is not received at the second reception time from the at least one other terminal, the selectively controlling step deactivates the barrier panel and displays the first image as the two-dimensional image.

6. The method of claim 5, wherein the barrier panel separates sights incident to the display unit if the barrier panel is activated.

7. The method of claim 5, further comprising:
   composing a pair of images by pixel when the control information indicates images are to be displayed as three-dimensional images.

8. The method of claim 5, further comprising:
   tuning an amount of light being transparent through the barrier panel by gradually driving a voltage of the barrier panel.

* * * * *